R. C. BLAKE.
Pressure Gage.
No. 211,317.        Patented Jan. 14, 1879.
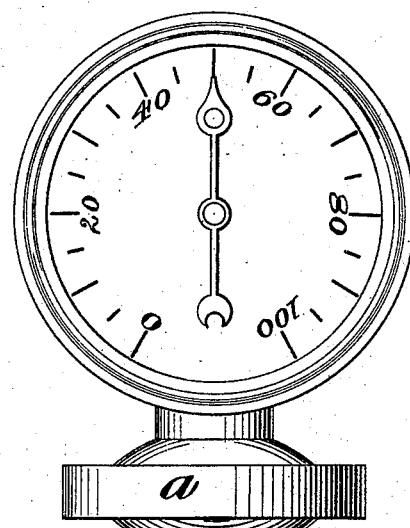
Fig.2.
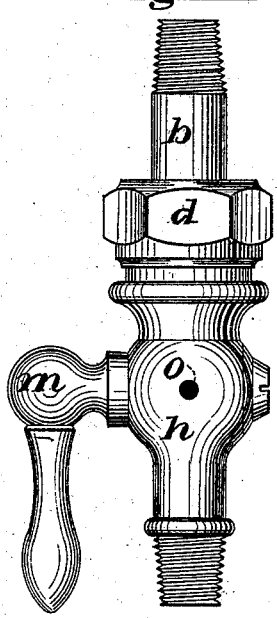
Fig.1.
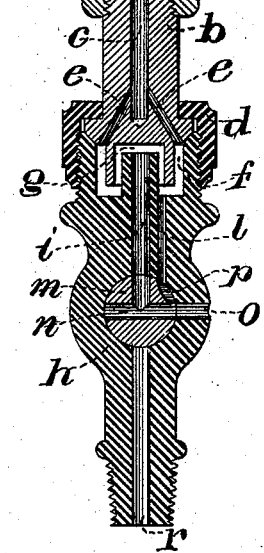
Witnesses
Roht L Griffitt
John Kaefer
By
Inventor
Richard C. Blake
John H. Nill
Attorney

UNITED STATES PATENT OFFICE.

RICHARD C. BLAKE, OF HAMILTON, OHIO, ASSIGNOR TO BLAKE STEAM GAUGE COMPANY, OF SAME PLACE.

IMPROVEMENT IN PRESSURE-GAGES.

Specification forming part of Letters Patent No. 211,317, dated January 14, 1879; application filed June 18, 1878.

*To all whom it may concern:*

Be it known that I, RICHARD C. BLAKE, of Hamilton, county of Butler, and State of Ohio, have invented certain new and useful Improvements in Siphon-Cocks for Steam-Gages, of which the following is a specification:

The invention relates to what are known as "trap-cocks;" and consists in providing in the ordinary stop-cock attached to steam-gages a trap or condensing-chamber, whereby the steam is prevented from impinging directly on the spring of the gage, but exerts its force through an intermediate water-column, thus preventing injury to the spring which would otherwise occur; and also consists in providing a convenient means for draining the condensing-chamber and clearing it of sediment.

The necessity for introducing a column of water between the steam and the spring of a steam-gage is recognized by engineers and steam-gage makers, and the ordinary U or S siphon tube is commonly employed, to which an ordinary stop-cock is screwed to regulate the flow of steam to the gage; but the ordinary siphon, made of iron-pipe and bent to form, possesses the inherent defect that, while it will discharge its functions as a trap or condensing-chamber and furnish the desired water-column, it cannot be drained without removing it from the gage and destroying all the connections, and as this cannot be done with steam-pressure on it follows that the common siphon is simply an expedient, and not a competent device for the required purpose.

In the siphon or trap cock shown and described all the desirable qualities are obtained. It provides a perfect condensing-chamber and water-column with easy and complete drainage.

The inventor is aware that attempts have been made to produce a successful device of this kind; but the resultant mechanisms are defective to the extent that perfect drainage is not accomplished, and if sediment from the steam collects in the passages it becomes impossible to remove it with any degree of convenience, while in the trap-cock, the subject of this specification, all passages are short and straight, and any sediment may be blown out by steam-pressure.

In the accompanying drawing, in which similar letters of reference refer to similar parts, Figure 1 is a sectional elevation of the improved trap-cock with steam-gage attached, and Fig. 2 an elevation of the cock independent of gage.

The stop-cock, which checks the flow of steam to the gage, is provided with a union-joint at its upper end, to the nipple of which the steam-gage A is screwed. The nipple B is provided with a central bore, C, into which are drilled the angular holes E E. The bottom of the nipple is solid, and is furnished with an inverted cup or deflector, which fits over and provides an annular chamber around the nozzle G. The diameter of the counter-bore F is considerably larger than the deflector on the nipple, and forms an annular chamber around the deflector. The angular holes E E communicate with the exterior annular chamber. The nipple B is provided with a ground joint, and is attached to the cock by the screw-yoke D. The key of the cock is provided with a full-way, N, through it, and a half-way, M, intersecting the full-way at the axis. The key is also provided with a groove or channel, P, cut in the periphery, which communicates with and forms an extension to the small passage L in the body of the cock. The ways or passages in the key are at right angles to each other, and the orifice O in the body of the cock at an angle of ninety degrees to the main passages I and R.

The key is shown in position to drain the condensing-chamber, and the passages N and P in communication with the orifice O. When the key is revolved through an angle of ninety degrees to the left the orifice O is closed, and the passage N is made to coincide with the passages I and R. When in this position steam flows through the central passage and strikes the deflector, where it condenses and fills the annular chambers F and G and the angular passages E E and central bore C of the nipple B. The steam-pressure, instead of impinging on the spring of the gage, acts on the water of condensation in the condensing-chamber, and the spring of the gage is protected from injury by the hot steam.

It may be convenient to vary from the precise form of device shown and described without departing from the principles of construction and operation.

What I claim as my invention is—

In siphon-cocks for steam-gages, a cock provided with openings for the passage of steam to the condensing-chamber and for draining said chamber, substantially as shown and described.

RICHD. C. BLAKE.

Witnesses:
ROBT. L. GRIFFITH,
JOHN KAEFER.